United States Patent [19]

Yamamura

[11] 4,360,907
[45] Nov. 23, 1982

[54] DISC-SHAPED RECORDING MEDIUM REPRODUCING APPARATUS

[75] Inventor: Takashi Yamamura, Yokohama, Japan

[73] Assignee: Victor Company of Japan, Ltd., Yokohama, Japan

[21] Appl. No.: 257,165

[22] Filed: Apr. 24, 1981

[51] Int. Cl.³ .......................... G11B 3/02; H04N 5/76
[52] U.S. Cl. ........................................ 369/77; 369/194
[58] Field of Search ................. 369/77, 194, 191, 180

[56] References Cited

U.S. PATENT DOCUMENTS

| | | | |
|---|---|---|---|
| 3,899,181 | 8/1975 | Dannart et al. | 369/194 |
| 3,941,391 | 3/1976 | Ohmiya et al. | 369/180 |
| 4,124,866 | 11/1978 | Coleman | 369/77 |

FOREIGN PATENT DOCUMENTS

| | | | |
|---|---|---|---|
| 2220434 | 11/1973 | Fed. Rep. of Germany | 369/194 |
| 52-72201 | 6/1977 | Japan | 369/77 |

*Primary Examiner*—Steven L. Stephan
*Attorney, Agent, or Firm*—Louis Bernat

[57] ABSTRACT

A reproducing apparatus reproduces a disc-shaped recording medium which is accommodated within a case. The case comprises a jacket which has a space for accommodating the disc-shaped recording medium and an opening for allowing the disc-shaped recording medium to go in and out of the jacket, and a lid member inserted through the opening of the jacket for closing the opening of the jacket. The reproducing apparatus comprises an inserting opening part through which the case is inserted into the reproducing apparatus a turntable for rotating the disc-shaped recording medium, a clamping mechanism for clamping at least one of the disc-shaped recording medium or the lid member provided at the innermost part on the opposite side from the inserting opening part with respect to the turntable a pair of guide rails provided extending between a position of the inserting opening part and a position at an innermost part of the reproducing apparatus, at right and left sides of a moving passage of the case, and slider mechanisms inserted with the pair of guide rails therethrough. The slider mechanisms are freely slidable along the pair of guide rails, and engages with the case and moves in response to the inserting and pulling out operation of the case. The slider mechanism has main slider bodies respectively inserted with the pair of guide rails therethrough, and has arm portions which oppose the upper and lower surfaces of the guide rails, and rollers provided at the arm portions of the main slider body, where the rollers roll over the guide rails.

7 Claims, 6 Drawing Figures

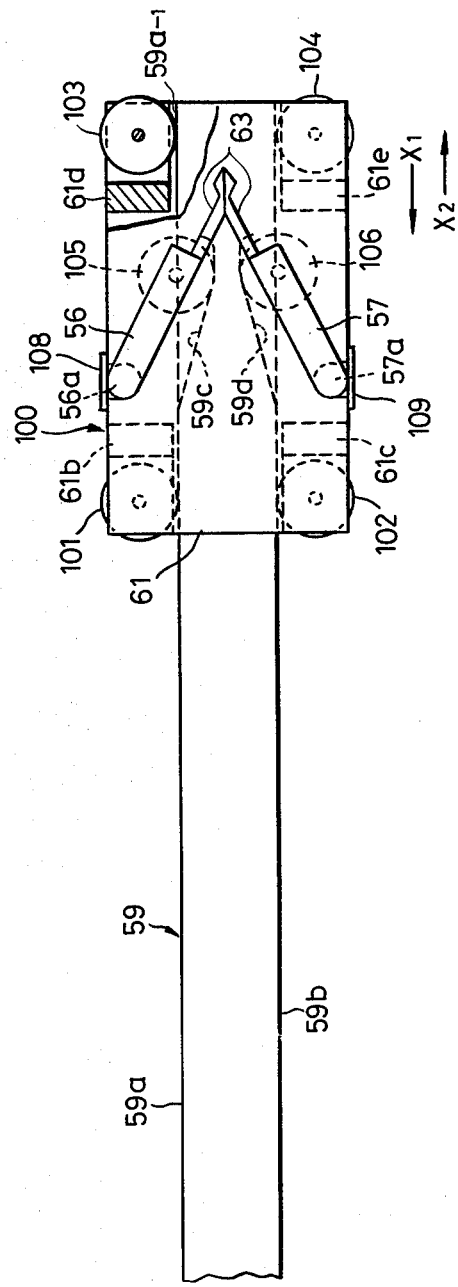

DISC-SHAPED RECORDING MEDIUM REPRODUCING APPARATUS

BACKGROUND OF THE INVENTION

The present invention generally relates to disc-shaped recording medium reproducing apparatuses, and more particularly to a disc-shaped recording medium reproducing apparatus capable of placing and leaving a disc-shaped information recording medium in a state possible for reproduction within the reproducing apparatus when a case having a lid for accommodating the recording medium therein is inserted into and then pulled out from within the reproducing apparatus, and also capable of incasing the recording medium within the case so that the recording medium can be obtained outside the reproducing apparatus together with the case, when the empty case is inserted into and then pulled out from within the reproducing apparatus. The present invention further and especially relates to the above reproducing apparatus in which rollers which move on guide rails, are provided in main slider bodies which support the left and right ends of the disc case at the front end side along the inserting direction of the disc case and move along the guide rails.

Conventionally, in an apparatus for reproducing a disc-shaped recording medium (referring to video disc, PCM audio disc, and the like, and hereinafter simply referred to as a disc), there are types of apparatuses in which a disc is reproduced when the disc is loaded upon holding and placing of the disc within the reproducing apparatus, by inserting into and then pulling out a disc case which has a lid and accommodates a disc therein, from within the reproducing apparatus. As a conventional apparatus of this type, there is an apparatus which cooperates with a disc case comprising a rigid jacket for accommodating a disc, and a tray having a front part which is engaged by engaging means upon complete insertion of the disc case within the reproducing apparatus and an annular or ring portion fixed to the front part for encircling the outer periphery of the disc. This conventional reproducing apparatus is constructed so that when this disc case is inserted within the reproducing apparatus to a predetermined position, the engaging means of the reproducing apparatus engages to and holds onto the front part of the tray. Hence, when the jacket is pulled out from within the reproducing apparatus, the disc is held by the annular portion of the tray and relatively slipped out from the jacket at the above predetermined position, and the outer peripheral edge part of the disc rests on and is supported by a supporting mechanism within the reproducing apparatus. Then, a turntable relatively rises within the inner side of the supporting mechanism, and the disc is placed onto and is unitarily rotated with the turntable, to perform the reproduction. After completion of the reproduction, when the empty jacket is inserted into the reproducing apparatus, the disc is relatively inserted into the jacket together with the annular portion of the tray, and the engagement of the engaging means is released. Accordingly, when the jacket is pulled out from the reproducing apparatus, the disc and the tray is obtained outside the reproducing apparatus together with the jacket in a state in which the disc and the tray is incased inside the jacket.

Thus, in the above disc case, for use with the conventional reproducing apparatus, the peripheral side surface of the disc is held by the engaged annular portion of the tray and the disc remains within the reproducing apparatus upon pulling of the jacket outside the reproducing apparatus. Accordingly, a supporting mechanism which is placed with the remaining disc thereon and supports the outer peripheral edge part of the disc, is provided in the reproducing apparatus. Hence, the turntable must be constructed so as to relatively move up-and-down within the inner side of the supporting mechanism. This means that the diameter of the turntable must be smaller than the diameter of the disc, and the outer peripheral edge part of the turntable thus makes contact with and supports the disc at the signal recording surface which is to the inner side of the outer peripheral edge part of the lower disc surface. Therefore, scratches are easily made on the signal recording surface part of the disc which is supported by the turntable, and especially when starting the rotation of the turntable, suffers a disadvantage in that scratches are more easily made in this case due to a force acting in a direction so as to rub the disc. Accordingly, when the disc is used many times, fine reproduction cannot be obtained due to the above scratches formed on the signal recording surface of the disc.

Moreover, upon reproduction, when a reproducing transducer of the reproducing apparatus moves to the position of the signal recording surface on the disc surface, the reproducing transducer must traverse over the annular portion of the tray. This traversing movement accordingly leads to a disadvantage in that the reproducing transducer moving mechanism must be designed so that the reproducing transducer does not collide with the annular portion, and the construction of the mechanism thus becomes complex.

Accordingly, in United State Patent Application entitled "DISC-SHAPED RECORDING MEDIUM REPRODUCING APPARATUS" in which the assignee is the same as that of the present application, a reproducing apparatus was proposed which cooperates with a disc case having a jacket which has a space for accommodating a disc and an opening for allowing the disc to go in and out the jacket, and a lid member inserted through the opening of the jacket for closing the opening of the jacket, where the reproducing apparatus comprises an inserting opening through which the case is inserted, a turntable for rotating the disc, holding means for holding at least one of the disc and the lid member provided at an inner-most part on the opposite side from the inserting opening with respect to the turntable, lowering and raising means for lowering the disc to a position where the disc is placed on the turntable from a holding position where the disc is held by the holding means upon starting of the reproduction and raising the disc to the holding position from the turntable upon finishing or discontinuing of the reproduction, a reproducing transducer for reproducing the disc placed on the turntable, and moving means for moving the reproducing transducer from a waiting position to a reproducing position with respect to the disc.

On the other hand, slider mechanisms which support the left and right ends of the disc case along the inserting direction of the disc case, and move along guide rails, are constructed so that upper and lower arm portions of main slide bodies make contact with and hold onto the guide rails. Accordingly, the main slider bodies slide along the guide rails against the friction introduced between the upper and lower arm portions and the guide rails. However, the inserting and pulling out operation of the disc case could not be performed by use of a small force, since the sliding friction between the upper and lower arm portions and the guide rails is relatively large.

SUMMARY OF THE INVENTION

Accordingly, a general object of the present invention is to provide a novel and useful disc-shaped recording medium reproducing apparatus in which the above described problems have been eliminated.

Another and more specific object of the present invention is to provide a disc-shaped recording medium reproducing apparatus in which rollers which move on guide rails, are provided in main slider bodies which support the left and right ends of a disc case along the inserting direction of the disc case and move along the guide raisl.

Further objects and features of the present invention will be apparent from the following detailed description when read in conjunction with the accompanying drawings.

BRIEF DESCRIPTION OF THE DRAWINGS

FIGS. 4A, 4B, and 4C are diagrams respectively showing the operating states of the slider mechanism shown in FIG. 3, at different positions along the longitudinal direction of the guide rails.

DETAILED DESCRIPTION

Figure 1:
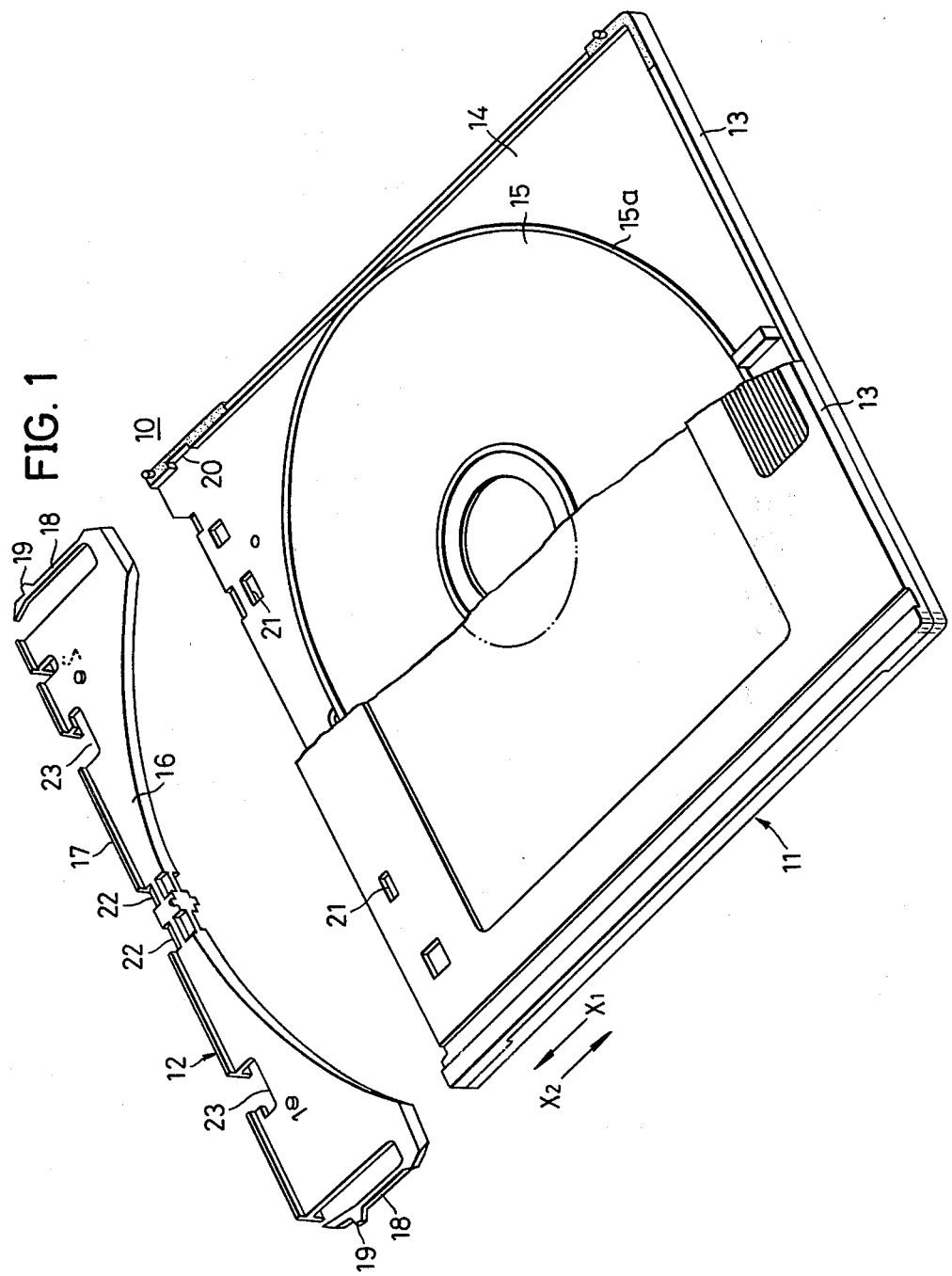
FIG. 1 is a perspective view showing an example of a disc case which operates together with a disc reproducing apparatus according to the present invention, with a part cut away and disassembled.

FIG. 1 shows an example of a disc case which operates together with a disc reproducing apparatus of the present invention, where a disc case 10 comprises a jacket 11 and a lid plate 12.

The jacket 11 is assembled from a pair of jacket halves 13 and 13, and comprises a flat cavity or space 14 therein. This space 14 accommodates a disc 15. The lid plate 12 comprises a plate-shaped main lid body 16, and a rim portion 17 formed unitarily at the front edge of the main lid body 16. A pair of engaging arms 18 are formed on both sides of the main lid body 16. The main lid body 16 of the lid plate 12 is inserted into a predetermined position within the jacket 11. Moreover, a projection 19 of the engaging arm 18 engages into a depression 20, and thus, the lid plate 12 engages with the jacket 11.

Figure 2:
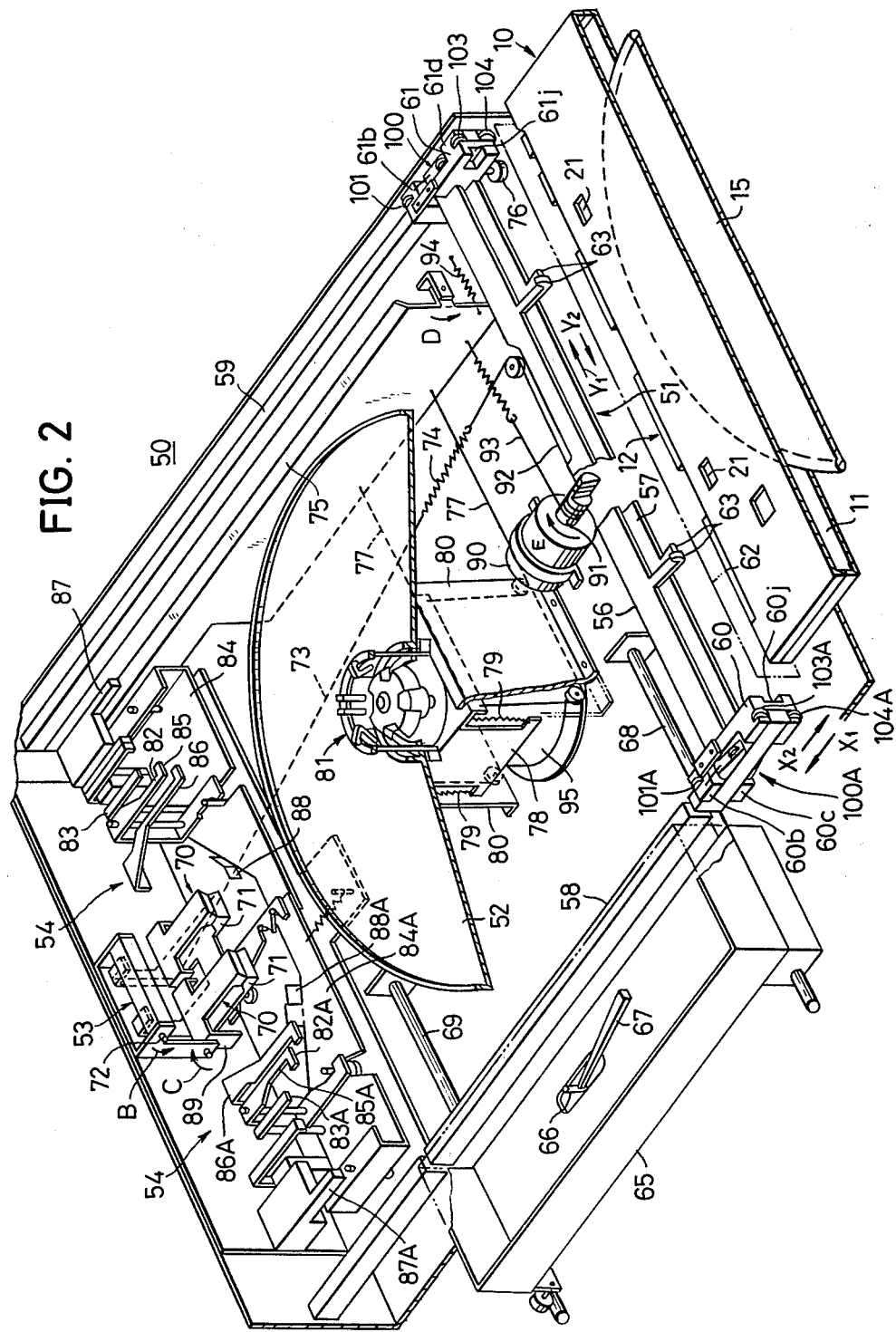
FIG. 2 is a perspective view showing the inner construction of a disc reproducing apparatus according to the present invention, with a part cut away.

As shown in FIG. 2, a reproducing apparatus 50 substantially comprises a jacket opening enlarging mechanism 51, a turntable 52 to rotate the disc 15 positioned thereon, a disc holding mechanism 53 for clamping the disc 15, a lid plate locking mechanism 54 for locking the lid plate 12, and the like.

The jacket opening enlarging mechanism 51 comprises upper and lower beams 56 and 57 extending in the directions of the arrows Y1 and Y2, and supporting members (main slider bodies) 60 and 61 (slider mechanisms 100 and 100A will be described hereinafter) support both ends of the respective beams 56 and 57. The jacket opening enlarging mechanism 51 is guided by guide rails 58 and 59, and moves between the innermost part of the reproducing apparatus 50 and a disc case inserting opening 62 provided at the frame of the reproducing apparatus 50, in the directions of the arrows X1 and X2.

Enlarging fingers 63 are respectively formed on each of the beams 56 and 57, directed towards the inserting opening 62. When each of the beams 56 and 57 are positioned on the side of the inserting opening 62, the enlarging fingers 63 mutually close upon each other, and when the beams 56 and 57 move in the direction of the arrow X1, the enlarging fingers 63 rotate in upward and downward directions so as to mutually separate from each other.

A pickup frame 65 is provided with a reproducing stylus 66 and a cantilever 67, and moves in the directions of the arrows Y1 and Y2 along a pair of guide rods 68 and 69.

The disc holding mechanism 53 and the lid plate locking mechanism 54 are constructed symmetrically on the left and right sides with respect to a line which passes through the center of the turntable in the direction of the arrow X1. The parts on the left side are designated by the same reference numerals as the corresponding parts on the right side, with a subscript "A", and their description will be omitted.

The disc holding mechanism 53 is provided at the inner part of the reproducing apparatus 50 on the opposite side of the inserting opening 62, and comprises a pair of upper and lower holding fingers 70 and 71. The lower holding finger 71 is axially supported on an upper pin 72. A wire 73 is linked to the holding finger 71, and the holding finger 71 receives a rotational force in the direction of arrow B due to the force of a spring 74. Accordingly, the holding finger 71 receives a force urging rotation in the upward direction. The upper holding finger 70 is axially supported by a pin.

Upon reproduction of the disc 15, the disc case 10 is inserted through the inserting opening 62 of the reproducing apparatus 50, by inserting the disc case 10 with the side of the lid plate 12 into the direction of the arrow X1. When the jacket opening enlarging mechanism 51 is pushed and moved in the direction of the arrow X1 by the disc case 10. When the enlarging mechanism 51 moves, the upper and lower beams 56 and 57 rotate, and the enlarging fingers 63 thus respectively move in a direction to mutually separate from each other. Accordingly, the tip ends of the enlarging fingers 63 engage with engaging windows 21 of the jacket 11, and enlarge the front part of the upper and lower jacket halves 13 upwards and downwards, to enlarge the opening.

A sloping surface of a rotary plate 75 is pushed by a roller 76 provided on the main slider body 61, and the rotary plate 75 rotates in the direction of the arrow D, due to the movement of the jacket opening enlarging mechanism 51. Accompanied by the rotation of the rotary plate 75, a wire 77 is pulled, an a push-up plate 78 is accordingly pulled downwards. Four corners of the push-up plate 78 are suspended and supported by springs 79 with respect to a support plate 80. Due to the downward movement of the pushup plate 78, a disc clamping mechanism 81 moves downwards, to retreat from the insertion passage of the disc case 10.

When the disc case 10 is inserted into the innermost part of the reproducing apparatus 50 together with the enlarging mechanism 51 through the upper side of the turntable 52, ride-over parts 22 of the lid plate 12 enter between the holding parts which are positioned mutually opposite to the holding fingers 70 and 71, and pass through these holding parts by pushing and spreading these parts. The holding fingers 70 and 71 close, as will be described hereinafter, after the rideover parts 22 of the lid plate 12 have passed through, and the holding parts accordingly clamp a groove guard 15a of the disc 15.

Accompanied by the insertion of the disc case 10, locking fingers 82 and 82A relatively enter inside L-shaped cutouts 23 of the lid plate 12, and the rim portion 17 accordingly pushes contact fingers 83 and 83A. When the contact fingers 83 and 83A are pushed by the lid plate 12, main levers 84 and 84A respectively rotate to be latched. Furthermore, the locking fingers 82 and 82A rotate in directions so as to mutually separate from each other, and L-shaped parts 85 and 85A provided at the tip ends of the above locking fingers 82 and 82A respectively enter into the innermost parts of the cutouts 23, to lock the lid plate 12. The lid plate 12 is limited of its movement in the direction of the arrow X1 by the contact fingers 83 and 83A, and the lid plate 12 is thus locked and supported at the innermost part of the reproducing apparatus 50 in a state in which the lid plate 12 is placed and supported on supporting fingers 86 and 86A.

Furthermore, engagement releasing members 87 and 87A enter inside the openings on the right and left sides of the disc case 10, and push the sloping surfaces at the tip ends of the engaging arms 18. Accordingly, the engaging arms 18 are respectively distorted inwards, and the projections 19 respectively slip out from the depressions 20, to release the engagement of the lid plate 12 with respect to the jacket 11.

When the main levers 84 and 84A rotate to positions where they are latched, the leaf springs 88 and 88A respectively provided at the bent parts of the main levers push against a vertically extending part 89 of the upper holding finger 70. Hence, a rotational force in the direction of the arrow C is applied to the holding finger 70. Thus, the disc 15 is held at a predetermined height by the lower holding finger 71 and the upper holding finger 70.

Accordingly, when the disc case 10 is inserted into the final position, the engagement of the lid plate 12 with respect to the jacket 11 is released, and the disc 15 thus becomes locked by the locking fingers 82 and 82A, and held by the holding fingers 70 and 71.

Next, the jacket 11 is pulled out in the direction of the arrow X2. Since the lid plate 12 and the disc 15 are respectively locked and clamped as described above, only the jacket 11 is moved in the direction of the arrow X2, leaving behind the lid plate 12 and the disc 15. Accompanied by this pulling out of the jacket 11, the lid plate 12 and the disc 15 are relatively pulled out from within the jacket 11.

Accompanied by the movement of the jacket 11 in the direction of the arrow X2, the jacket opening enlarging mechanism 51 also moves together with the jacket in the direction of the arrow X2.

When the jacket 11 is pulled out to the vicinity of the inserting opening 62, the rotary plate 75 rotationally returns and the disc-clamping mechanism 81 moves up to support the center part of the disc 15. Furthermore, when the jacket 11 is pulled out, the disc 15 completely separates from the jacket 11, the jacket opening enlarging mechanism 51 returns to its original position, and the jacket opening enlarging fingers 63 rotate in directions so as to mutually close upon each other and separate from the engaging windows 21. The jacket 11 returns to its original state due to its flexibility, and the enlarged opening also returns to the original state, and the jacket 11 is completely pulled out from the reproducing apparatus 50. In this state, the disc 15 is supported horizontally at a position above the turntable 52, by the holding fingers 70 and 71 and the disc clamping mechanism 81.

When a play button (not shown) is then pushed, a motor 90 begins to rotate, and a take-up shaft 91 rotates in the direction of arrow E, and hence wires 92 and 93 are thus pulled out from the take-up shaft 91. Accordingly, the holding finger 71 rotates in a direction opposite to the direction of the arrow B, to release the clamping with respect to the disc 15. Further, the rotary plate 75 is rotated in the direction of the arrow D by a tension spring 94, to move the disc clamping mechanism 81 downwards. Hence, the disc 15 moves down and is placed on the turntable 52, and held by the disc holding mechanism 53 which will be described hereinafter. The pickup frame 65 moves in the direction of the arrow Y1 from the waiting position, and the turntable 52 is rotated by a motor 95. Thus, the disc 15 is relatively scanned by the reproducing stylus 66, to reproduce the information signal.

Next, an operation in which the disc 15 is recovered from within the reproducing apparatus 50, will now be described.

Upon completion of the reproducing operation, the motor 90 rotates in a direction opposite to the direction as the above after the motor 95 and the turntable 52 stop rotating, and the take-up shaft 91 takes up the wires 92 and 93. Accordingly, the rotary plate 75 rotates in a direction so as to loosen the wire 77, and the disc clamping mechanism 81 thus moves up to push the disc 15 up. Furthermore, the holding finger 71 rotates in the direction of the arrow B, to hold the disc 15.

Upon recovering of the disc 15, the empty jacket 11 is inserted with its front end first into the reproducing apparatus 50 through the inserting opening 62. The jacket opening enlarging mechanism 51 is pushed by the jacket 11 and moves again in the direction of the arrow X1, to enlarge the opening of the jacket 11. Accompanied by the insertion of the jacket 11 in the direction of the arrow X1, the disc 15 is relatively inserted inside the jacket 11 through the opening.

When the jacket 11 is inserted into the innermost position inside the reproducing apparatus 50, the disc 15 becomes completely incased within the jacket 11, and furthermore, the locked lid plate 12 is relatively inserted within the opening of the jacket 11.

When the jacket 11 is inserted into the final position, the disc 15 is accommodated within the jacket 11, and the main part of the lid plate 12 which has been locked, is inserted inside the jacket opening.

Therefore, when the jacket 11 is pulled out in the direction of the arrow X2, the lid plate 12 then moves in the direction of the arrow X2 together with the jacket 11, and the disc 15 is pushed by the lid plate 12 and forcibly pushed out in the direction of the arrow X2 by the holding part. Accordingly, the disc 15 separates from the reproducing apparatus 50 to be recovered within the disc case 10.

Next, a first embodiment of a disc case slider mechanism which forms an essential part of the reproducing apparatus according to the present invention, will be described in conjunction with FIGS. 3, 4A, 4B and 4C.

In FIGS. 3, 4A, 4B and 4C, those parts which are the same and those corresponding parts in FIG. 2 are designated by the like reference numerals, and their description will be omitted.

The slider mechanisms 100 and 100A are respectively provided on the right and left guide rails 59 and 58. The slider mechanism 100 on the right hand side, and the slider mechanism 100A on the left hand side, are of the same construction, and thus, description will be given with respect to the slider mechanism 100 on the right hand side.

Figure 3:
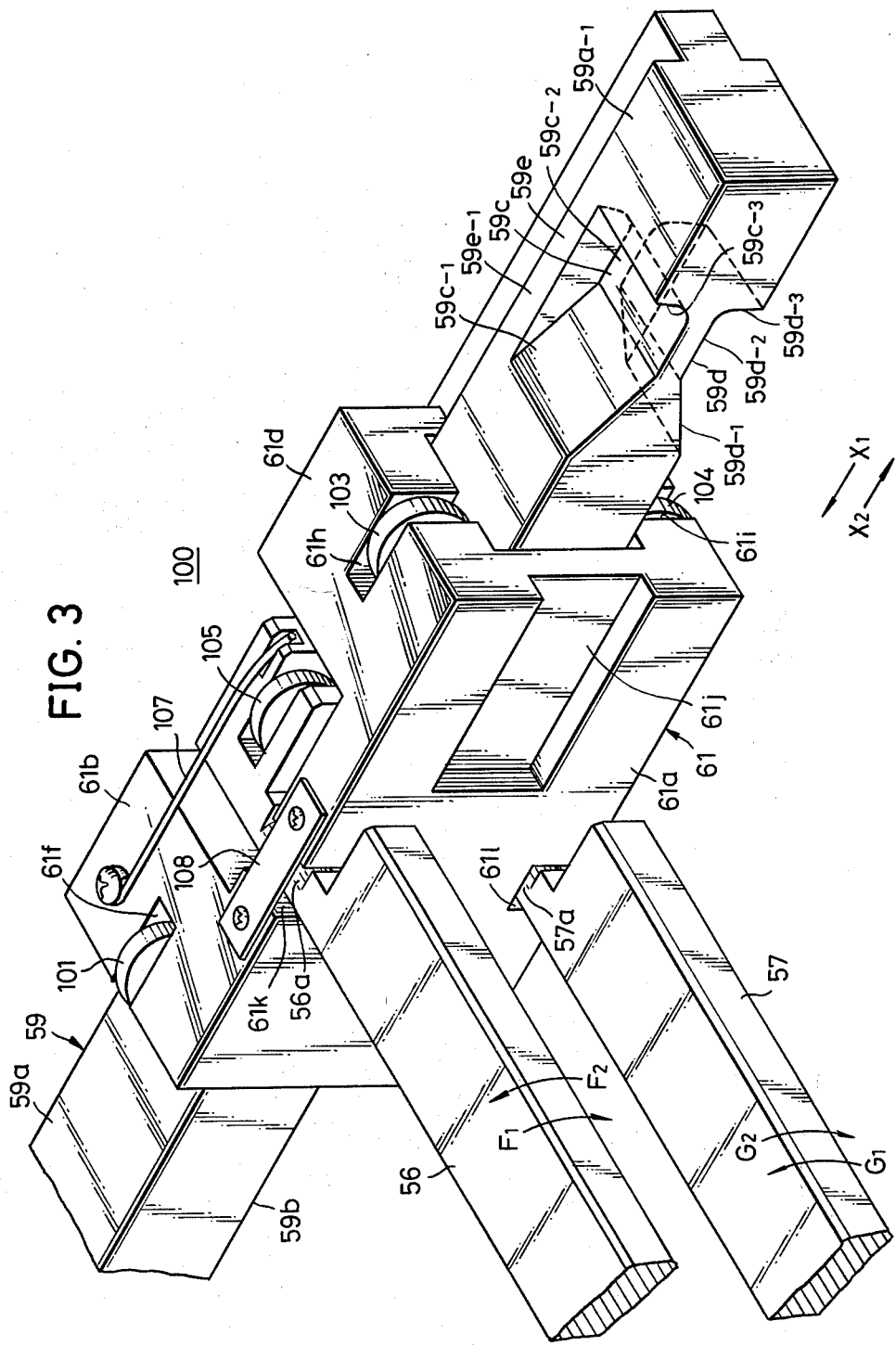
FIG. 3 is a perspective view showing a first embodiment of a slider mechanism which forms an essential part of the reproducing apparatus according to the present invention.
Figure 4A:
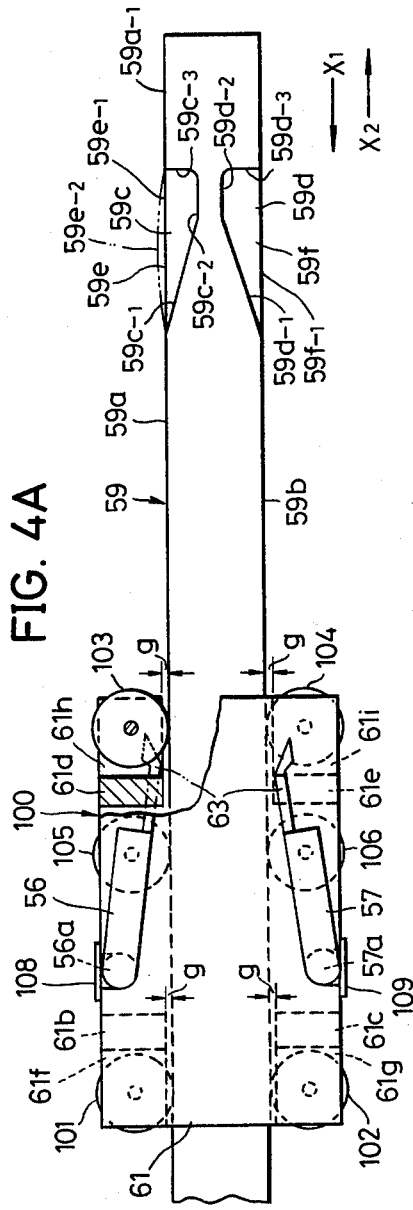

As shown in FIGS. 3 and 4A, rollers 101, 102, 103, and 104 are respectively assembled within the main slider body 61, and the guide rail 59 is accordingly slidably inserted into the slider mechanism 100. The main slider body 61 comprises upper and lower arm portions 61b, 61c, 61d, and 61e which are respectively formed at the upper and lower portions of main slider body portions 61a at the ends towards the directions of the arrows X1 and X2. Rollers 101 through 104 are respectively assembled within cutout portions 61f through 61i of respective arm portions 61b through 61e, in a freely rotatable manner, and are arranged along the moving directions of the main slider body 61. Accordingly, the rollers 101 and 103 respectively roll along a surface 59a of the guide rail 59, while the rollers 102 and 104 respectively roll along a lower surface 59b of the guide rail 59, and the main slider body moves along the guide rail 59 in the directions of the arrows X1 and X2. The movement of the main slider body 61 is smooth, since the movement is accompanied by the rolling of the above rollers.

Hence, when the left and right ends of the disc case 10 or the empty jacket 11 is inserted into depressions 61j and 60j provided at the inner sides of the main slider bodies 61 and 60, to insert into or pull out the disc case 10 from the reproducing apparatus 50, the slider mechanisms 100 and 100A respectively move being accompanied with the rolling of the rollers. Thus, the inserting and pulling out operation of the disc case 10 can be performed by use of a small force.

Narrow portions 56a and 57a of the upper and lower beams 56 and 57 are respectively inserted into cutouts 61k and 61l of the main slider body portions 61a in freely slidable manners, and the upper and lower beams 56 and 57 respectively are arranged between the slider mechanisms 100 and 100A. The openings of the cutouts 61k and 61l are respectively covered by plate members 108 and 109. Furthermore, rollers 105 and 106 are respectively provided freely rotatable in the vicinity of the end portions of the upper and lower beams 56 and 57. Moreover, the beams 56 and 57 are respectively urged to move in the directions of the arrows F1 and G1 by a spring 107 (a spring respective of the lower beam 57 is not shown).

Depressions 59c and 59d are respectively formed on the upper and lower surfaces of the guide rail 59, in the vicinity of the end of the guide rail 59 toward the direction of the arrow X2. The depressions 59c and 59d respectively comprise sloping surfaces 59c-1 and 59d-1, bottom portion planes 59c-2 and 59c-2, and vertical surfaces 59c-3 and 59d-3.

When the slider mechanism 100 (100A) is at a position at the front side of the reproducing apparatus 50 as shown in FIG. 4C, the rollers 105 and 106 respectively are inserted into the depressions 59c and 59d. In this state, the upper and lower beams 56 and 57 respectively rotate in the directions of the arrows F1 and G1, and the enlarging fingers 63 close upon each other. Due to the movement of the slider mechanism 100 (100A) in the direction of the arrow X2, the rollers 105 and 106 respectively ride over the sloping surfaces 59c-1 and 59d-1, and the upper and lower beams 56 and 57 respectively rotate in the directions of the arrows F2 and G2 against the force exerted by the spring 107. At this point, the enlarging fingers 63 enlarges the opening of the jacket 11 as described above.

In the above described slider mechanism 100, the rollers 103 and 104 which are in the side along the direction of the arrow X2, are arranged at positions crossing the depressions 59c and 59d, due to the shape and construction of the main slider body 61. Furthermore, each of the arm portions 61b through 61e are formed respectively having a gap g with respect to the upper and lower surfaces 59a and 59b of the opposing guide rail 59, since the above described rollers 101 through 104 are provided.

Accordingly, an inconvenient result is obtained upon pulling out of the disc case 10 or the jacket 11 from the reproducing apparatus 50. That is, since the gap g exists as shown in FIG. 4A, the arm portions 61b and 61c respectively do not have the function to restrict the slight rotation of the slider mechanism 100 in the clockwise direction, when the engagement of the arm portion 61d to the upper surface 59a of the guide rail 59 is released. In addition, the roller 103 of the slider mechanism 100 crosses the depression 59c, by the operation in which the jacket 11 is pulled out from the reproducing apparatus 59.

If it is assumed that the depression 59c is formed throughout the whole width of the guide rail 59, the arm portion 61d enters within the depression 59c upon movement of the slider mechanism 100 in the direction of the arrow X1. Therefore, the main slider body 61 rotates over a large angle in the clockwise direction, and the roller 103 falls into the depression 59c as shown by the tow-dot chain line in FIG. 4B. Accordingly, when the slider mechanism 100 further moves in the direction of the arrow X2 and the roller 103 rides over the upper surface 59a-1 at the end of the guide rail 59 along the direction of the arrow X2, the roller 103 sometimes strikes against the vertical surface 59c-3 with a large impact, and in some cases, the roller 103 cannot ride over the vertical surface 59c-3. That is, when an operation is performed in which the jacket 11 is pulled out from the reproducing apparatus 50, impulsive forces may act against the above pulling operation of the jacket 11, or the above operation could be restricted halfway during the operation.

Hence, in the reproducing apparatus according to the present invention, bridging portions 59e and 59f are respectively formed over the depressions 59c and 59d of the guide rail 59. These bridging portions 59e and 59f are respectively formed at the outer end sides of the guide rail 59, so that the insertion of the rollers 103 and 104 and the end portions of the upper and lower beams 56 and 57 into the depressions 59c and 59d are not restricted. Moreover, a lower surface 59f-1 of another bridging portion 59f is formed as an extending surface of the surface 59b.

Figure 4B:
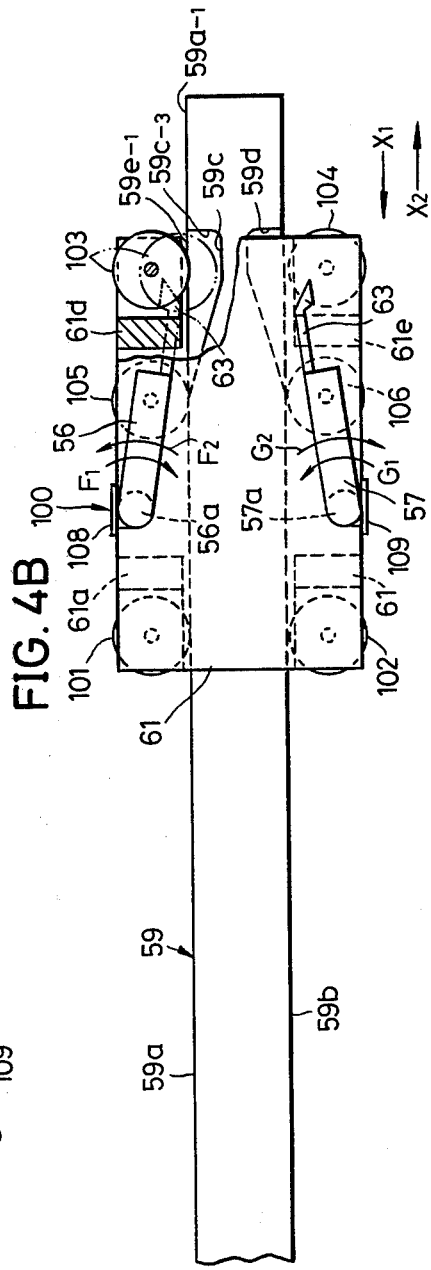

Accordingly, due to the pulling out operation of the jacket 11 from the reproducing apparatus 50, the slider mechanism 100 (100A) moves in the direction of the arrow X2. When the roller 103 reaches a position opposing the depression 59c, the rotation of the main slider body 61 in the clockwise direction is restricted in a state where the arm portion 61*d* makes contact with an upper surface 59*e*-1 of the bridging portion 59*e* as shown in FIG. 4B, and the dropping amount of the roller 103 into the depression 59*c* becomes small.

Therefore, when the slider mechanism 100 (100A) returns to the original position shown in FIG. 4C, the roller 104 crosses over the depression 59*c* in a state where the roller 104 only drops into the depression 59*c* by a small amount. Moreover, the roller 104 rides over the upper end portion of the vertical surface 59*c*-3 and moves over along the surface 59*a*-1. The impact is small when the roller 103 rides over the vertical surface 59*c*-3. Accordingly, the operation in which the jacket 11 is pulled out from the reproducing apparatus 50, is performed smoothly and accurately, where no resistive forces are introduced against the pulling operation of the jacket 11.

The upper surface of the bridging portion 59*e* can be formed as shown by the two-dot chain line in FIG. 4A, where the upper surface is a projecting curved surface 59*e*-2. In this case, the arm portion 61*d* is guided by the above projecting curved surface 59*e*-2, and the amount which the roller 103 drops into the depression 59*c* becomes zero. Furthermore, in this case, no impulsive forces act against the pulling operation of the jacket 11 from the reproducing apparatus 50, and the operation in which the jacket 11 is pulled out from the reproducing apparatus 50 is performed more smoothly.

Further, this invention is not limited to these embodiments but various variations and modifications may be made without departing from the scope of the invention.

What is claimed is:

1. A reproducing apparatus for reproducing a disc-shaped recording medium which is accommodated within a case, said case comprising a jacket which has a space for accommodating said disc-shaped recording medium and an opening for allowing said disc-shaped recording medium to go in and out of said jacket, and a lid member inserted through said opening of said jacket for closing said opening of said jacket, said reproducing apparatus comprising:

an inserting opening part through which said case is inserted into said reproducing apparatus;
    a turntable for rotating said disc-shaped recording medium;
    clamping means for clamping at least one of said disc-shaped recording medium or said lid member provided at the innermost part on the opposite side from said inserting opening part with respect to said turntable;
    a pair of guide rails provided extending between a position of said inserting opening part and a position at an innermost part of said reproducing apparatus, at right and left sides of a moving passage of said case; and
    slider means inserted with said pair of guide rails therethrough, said slider means being freely slidable along said pair of guide rails, and engaging with said case and moving in response to the inserting and pulling out operation of said case,
    said slider means having main slider bodies respectively inserted with said pair of guide rails therethrough, and having arm portions which oppose the upper and lower surfaces of said guide rails, and rollers provided at said arm portions of said main slider body, said rollers rolling over said guide rails.

2. A reproducing apparatus as claimed in claim 1 in which said main slider bodies respectively have pairs of said arm portions respectively provided opposing the upper and lower surfaces of said guide rails, at both ends positions of said main slider bodies along the moving directions of said main slider bodies, and each of said rollers are respectively provided at each of said arm portions.

3. A reproducing apparatus as claimed in claim 2 in which each of said arm portions of said main slider bodies respectively have cutouts, and said rollers are respectively provided in a manner where said rollers respectively project from said arm portions on the sides of said guide rails and enter within said cutouts.

4. A reproducing apparatus as claimed in claim 1 in which said reproducing apparatus further comprises jacket opening enlarging means provided in the vicinity of said inserting opening part, said jacket opening enlarging means being movable between a position in the vicinity of said inserting opening part and a position at an innermost part of said reproducing apparatus over said turntable, and said slider means supports said jacket opening enlarging means.

5. A reproducing apparatus as claimed in claim 4 in which said guide rails respectively have depressions which operate together with said jacket opening enlarging means, said depressions being provided at the upper and lower surfaces of said guide rails, and bridging portions respectively provided at sections corresponding to said depressions, for supporting said arm portions respectively provided on said main slider body and positioned at the side of said inserting opening part, and preventing said arm portions from dropping into said depressions when said rollers respectively pass over said depressions.

6. A reproducing apparatus as claimed in claim 5 in which upper surfaces of said bridging portions respectively are planes which are extensions of upper surfaces of said guide rails.

7. A reproducing apparatus as claimed in claim 5 in which upper surfaces of said bridging portions are arcuate surfaces which slightly project from upper surfaces of said guide rails.

* * * * *